(12) United States Patent
Kawanami

(10) Patent No.: US 8,165,464 B2
(45) Date of Patent: Apr. 24, 2012

(54) IMAGE PICKUP APPARATUS WITH AF SENSOR UNIT

(75) Inventor: Jun Kawanami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/971,718

(22) Filed: Dec. 17, 2010

(65) Prior Publication Data

US 2011/0150444 A1    Jun. 23, 2011

(30) Foreign Application Priority Data

Dec. 22, 2009   (JP) .................................. 2009-290967

(51) Int. Cl.
*G03B 13/36*    (2006.01)
(52) U.S. Cl. ......................................................... 396/89
(58) Field of Classification Search .................. 396/89
See application file for complete search history.

(56) References Cited

U.S. PATENT DOCUMENTS

| | | | | |
|---|---|---|---|---|
| 4,404,595 A | * | 9/1983 | Ushiro et al. ................. | 348/357 |
| 4,555,169 A | * | 11/1985 | Suda et al. .................... | 396/111 |
| 4,728,785 A | * | 3/1988 | Ohnuki et al. ............. | 250/201.2 |
| 5,655,161 A | * | 8/1997 | Takagi .......................... | 396/271 |
| 2007/0086766 A1 | * | 4/2007 | Nomura et al. ................. | 396/89 |
| 2011/0150444 A1 | * | 6/2011 | Kawanami ...................... | 396/89 |

FOREIGN PATENT DOCUMENTS

JP    2001-208536    8/2001

\* cited by examiner

*Primary Examiner* — W. B. Perkey
(74) *Attorney, Agent, or Firm* — Cowan, Liebowitz & Latman, P.C.

(57) ABSTRACT

An image pickup apparatus with an AF sensor unit fixed thereto promptly with high precision by a parallax adjustment method. The image pickup apparatus with the AF sensor has a stationary cylinder. The stationary cylinder constitutes an image pickup lens barrel with a first axis and a second axis that are perpendicular to an optical axis of the lens barrel and are perpendicular to each other. An AF sensor holder is configured to hold said AF sensor. An AF sensor holder-mounting unit is mounted on the stationary cylinder through a first axis rotation-adjusting mechanism rotatably with respect to the first axis, and configured to support said AF sensor holder through a second axis rotation-adjusting mechanism rotatably with respect to the second axis. The first axis rotation-adjusting mechanism and the second axis rotation-adjusting mechanism are directed in the same direction at operation sides thereof, respectively.

4 Claims, 5 Drawing Sheets

IMAGE PICKUP APPARATUS WITH AF SENSOR UNIT

BACKGROUND OF THE INVENTION

1. Field of the Invention

The present invention relates to an image pickup apparatus with an AF sensor unit, and more particularly, to an image pickup apparatus with a man body having an AF sensor unit fixed thereto promptly with high precision by a parallax adjustment method.

2. Description of the Related Art

There has been developed an image pickup apparatus that has an AF sensor unit outside its image pickup optical system and is designed to measure the distance from a subject with the use of the AF sensor unit.

The AF sensor unit used in this manner may employ a passive AF method of performing measurement based on a triangular ranging principle, using two sets of optical systems each including a lens and a distance measuring image pickup element, for example.

Such an AF sensor unit needs to be fixed to an image pickup apparatus while being tilted at a predetermined angle in the optical axis direction of the image pickup lens such that the orientations of the two sets of optical systems correspond to the center of a subject image formed by picking up an image of the center of the subject located at a specific distance. Therefore, an AF sensor unit is normally mounted on the main body of an image pickup apparatus by performing a positioning and securing process with high precision, or by a so-called parallax adjustment method (see Japanese Laid-Open Patent Publication (Kokai) No. 2001-208536, for example).

A description will now be made of a method of mounting a conventional AF sensor unit on the main body of an image pickup apparatus by implementing a parallax adjustment method through an example case where an AF sensor unit of a passive AF type is fixed to a video camera, with reference to FIGS. 4 and 5.

In FIGS. 4 and 5, an AF sensor unit 1001 has built-in two sets of a lens and an AF sensor (AF-service image pickup elements). This AF sensor unit 1001 has a flexible board 1009 extending from the main body of the AF sensor unit 1001 for transmitting electric signals from the built-in AF sensor to a predetermined electric circuit (FIG. 5).

A lens unit 1004 of the video camera has an AF sensor holder-mounting unit 1002 for retaining the AF sensor unit 1001 in a holding manner screwed thereto with an AF sensor holder-mounting unit-fixing screw 1003.

This AF sensor unit 1001 has two adjustment holes 1010 therein. The AF sensor holder-mounting unit 1002 has a stopper boss 1008 protruding from a bottom portion thereof. The stopper boss 1008 is configured to be fitted into a concave portion (not shown) formed in the bottom portion of the AF sensor unit 1001, and serve as a stopper part when the attitude of the AF sensor unit 1001 is adjusted.

This AF sensor unit 1001 is to be subjected to a parallax adjustment method, described later, of performing the movement in adjustment directions (X, Y) 1007 with the use of adjustment tool pins 1005, each of which has a tapered end portion, protruding from a special-purpose adjustment tool. The AF sensor unit 1001 subjected to the parallax adjustment method is bonded and fixed to the AF sensor holder-mounting unit 1002 with a UV curing adhesive agent 1006 (at two spots).

A description will now be made of the parallax adjustment method for the AF sensor unit 1001.

According to this parallax adjustment method, the AF sensor unit 1001 is first placed on the AF sensor holder-mounting unit 1002. On this occasion, into the concave portion (not shown) formed on the bottom portion of the AF sensor unit 1001 is inserted the stopper boss 1008 of the AF sensor holder-mounting unit 1002, which enables the AF sensor unit 1001 to be supported by a pivot bearing and is set in a position-variable state.

In this state, the adjustment tool pins 1005, each of which has the tapered end portion, protruding from the special-purpose adjustment tool are inserted into the two adjustment holes 1010, which allows a predetermined downward load to be applied to the AF sensor unit 1001.

The adjustment tool pins 1005 are configured to pivotally move in the adjustment directions (X, Y) 1007 when a predetermined tab of the special-purpose adjustment tool (not shown) is rotatably moved. This operation enables the AF sensor unit 1001 to be pivotally moved about the stopper boss 1008 with its position adjusted.

Moreover, as a method of measuring the fixed angle with respect to the optical axis direction of the image pickup lens of the AF sensor unit 1001, there is normally used an output waveform measurement method of measuring the waveform of the AF sensor output projected on the chart with a chart placed at a predetermined distance from the image pickup lens.

After the AF sensor unit 1001 has thus been positioned at a predetermined fixed angle with the use of the special-purpose adjustment tool, a UV curing adhesive agent 1006 is applied to the two spots shown in the drawing, and then the UV curing adhesive agent 1006 is cured by UV rays emitted onto the UV curing adhesive agent 1006 for a certain period of time, before the adjustment tool pins 1005 are pulled out.

As described above, the AF sensor unit 1001 is positioned and fixed to the AF sensor holder-mounting unit 1002 of the lens unit 1004 in a desired position.

By the above parallax adjustment method, however, the AF sensor unit 1001 together with the AF sensor holder-mounting unit 1002 unfavorably bends downward when the adjustment tool pins 1005 are inserted into the two adjustment holes 1010 with the predetermined downward load applied to the AF sensor unit 1001.

Therefore, when the load of the adjustment tool pins 1005 is removed after the parallax adjustment (after the adjustment tool pins 1005 have been pulled out), the AF sensor holder-mounting unit 1002 and the like are elastically returned, thereby causing the AF sensor unit 1001 to move from the position determined by the parallax adjustment method, which provides an error. Also, the error caused by the movement from the position determined by the parallax adjustment makes it difficult to mount the AF sensor unit 1001 on the main body of the image pickup apparatus with high precision.

Also, the AF sensor unit 1001 is fixed at two spots with the UV curing adhesive agent 1006 after the parallax adjustment; accordingly, the AF sensor unit 1001 is affected by the adhesive curing stress, temperature changes, drops, and vibrations, thereby providing a deviation in the fixed position of the AF sensor unit 1001. This makes it difficult to position and secure the AF sensor unit 1001 with high precision.

Further, the time consumed by processes of the parallax adjustment method disadvantageously becomes longer, because of the adhesion curing time for the UV curing adhesive agent 1006.

SUMMARY OF THE INVENTION

The present invention provides an image pickup apparatus with an AF sensor unit fixed thereto promptly with high precision by a parallax adjustment method.

In an aspect of the present invention, there is provided an image pickup apparatus with an AF sensor unit, having a stationary cylinder constituting an image pickup lens barrel with a first axis and a second axis that are perpendicular to an optical axis of the lens barrel and are perpendicular to each other, the image pickup apparatus comprising: an AF sensor holder configured to hold the AF sensor; and an AF sensor holder-mounting unit mounted on the stationary cylinder through a first axis rotation-adjusting mechanism rotatably with respect to the first axis, and configured to support the AF sensor holder through a second axis rotation-adjusting mechanism rotatably with respect to the second axis, wherein the first axis rotation-adjusting mechanism and the second axis rotation-adjusting mechanism face in the same direction at operation sides thereof, respectively.

According to the invention, the AF sensor holder-mounting unit is mounted on the stationary cylinder constituting the image pickup lens barrel through the first axis rotation-adjusting mechanism rotatably with respect to the first axis, and supports the AF sensor holder holding the AF sensor through the second axis rotation-adjusting mechanism rotatably with respect to the second axis, and the first axis rotation-adjusting mechanism and the second axis rotation-adjusting mechanism face in the same direction at operation sides thereof, respectively. Accordingly, it is possible to provide an image pickup apparatus with a main body having an AF sensor unit fixed thereto promptly with high precision by a parallax adjustment method.

Further features and advantages of the present invention will become apparent from the following detailed description of exemplary embodiments with reference to the attached drawings.

DETAILED DESCRIPTION OF THE EMBODIMENTS

The present invention will now be described in detail with reference to FIGS. 1-3

Figure 1:
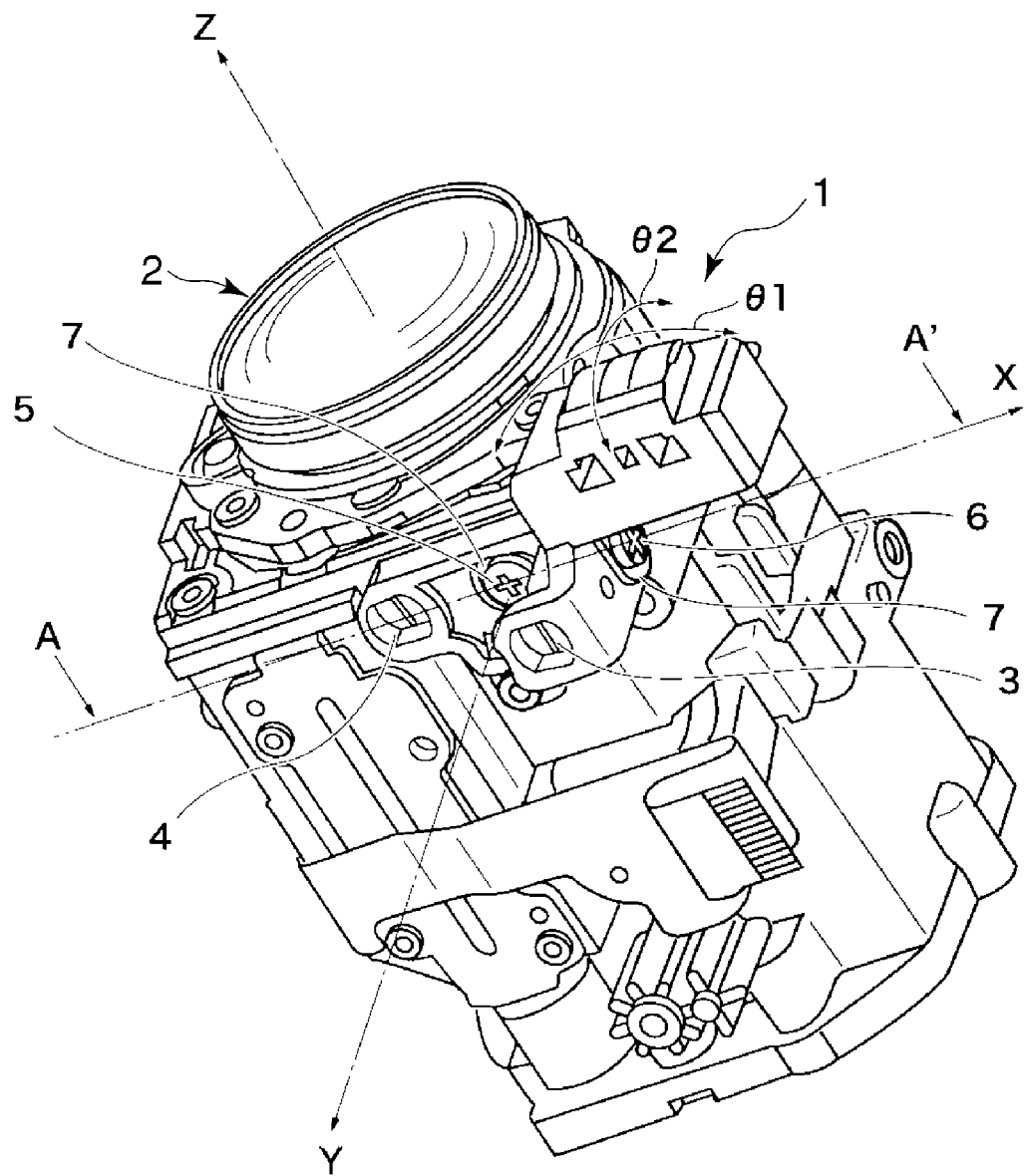
FIG. 1 is a perspective view of a principal part of an image pickup apparatus according to an embodiment of the present invention.
Figure 2A:
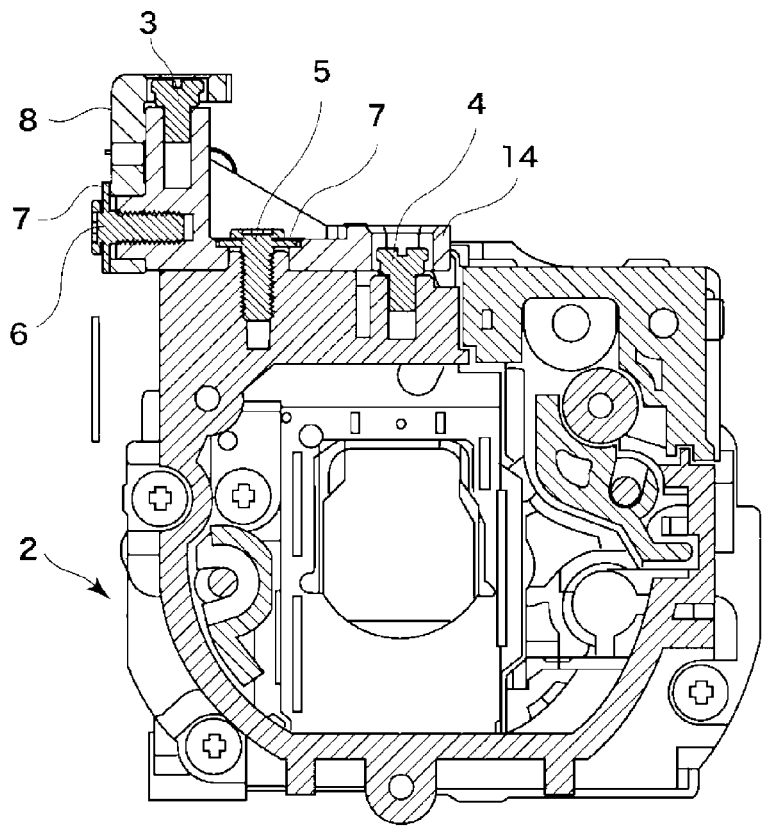
FIG. 2A is a cross-sectional view of the principal part of the image pickup apparatus, taken along the line A-A' in FIG. 1.
Figure 2B:
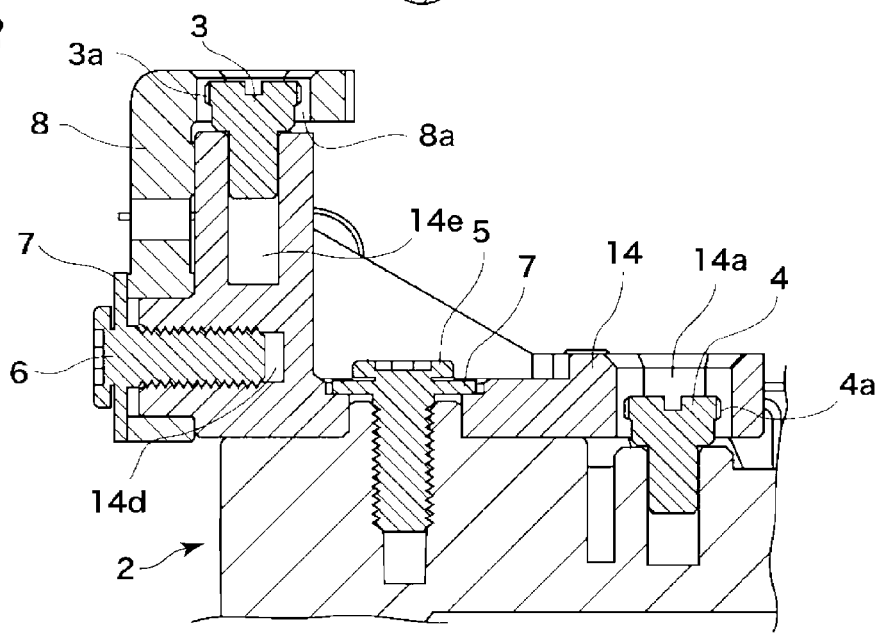
FIG. 2B is an enlarged cross-sectional view of the principal part shown in FIG. 2A.

FIG. 1 is a perspective view of a principal part of an image pickup apparatus according to an embodiment of the present invention, FIG. 2A is a cross-sectional view of the principal part of the image pickup apparatus, taken along the line A-A' in FIG. 1, and FIG. 2B is an enlarged cross-sectional view of the principal part shown in FIG. 2A.

In FIG. 1, a video camera as the image pickup apparatus according to the embodiment of the present invention includes an image pickup lens unit 2 (a stationary cylinder constituting an image pickup lens barrel) with and an AF sensor unit 1 mounted on an AF sensor holder-mounting unit 8.

Figure 3:
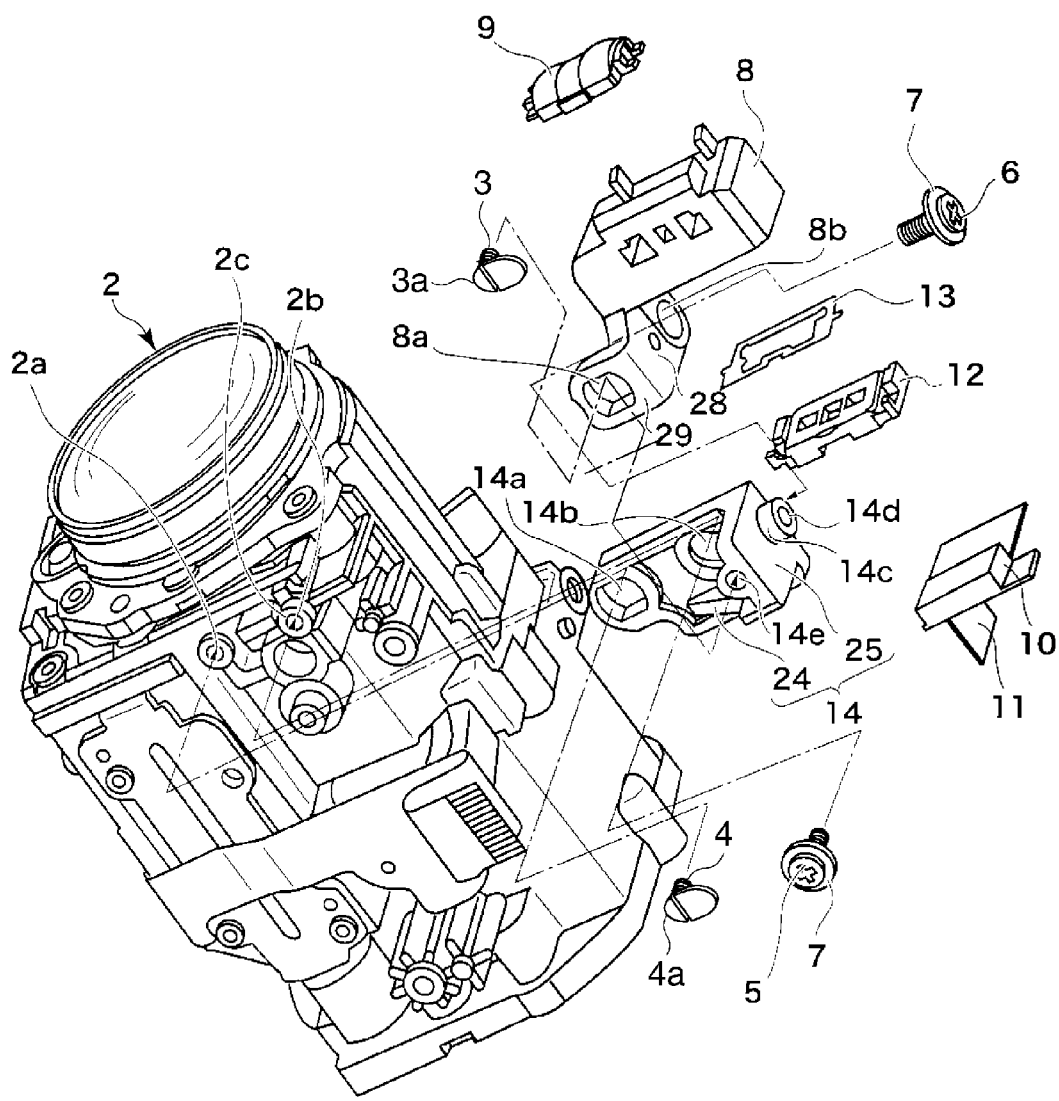
FIG. 3 is an exploded perspective view of the image pickup apparatus of FIG. 1.
Figure 4:
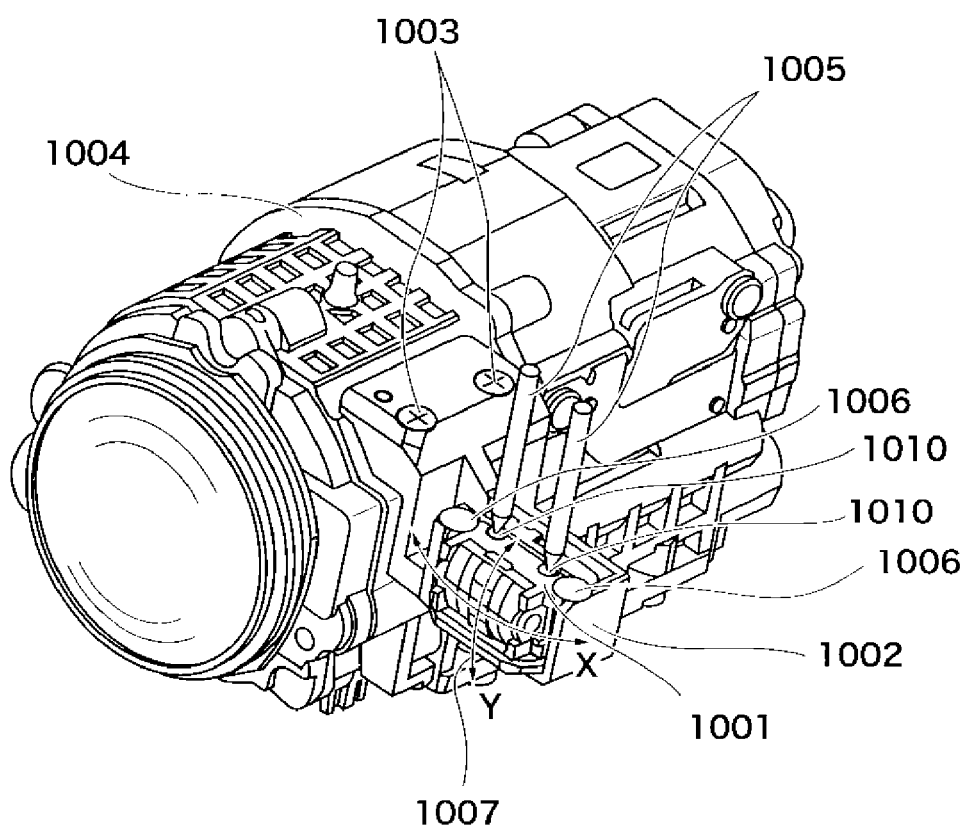
FIG. 4 is a perspective view of a principal part of a conventional image pickup apparatus with an AF sensor unit mounted thereon.
Figure 5:
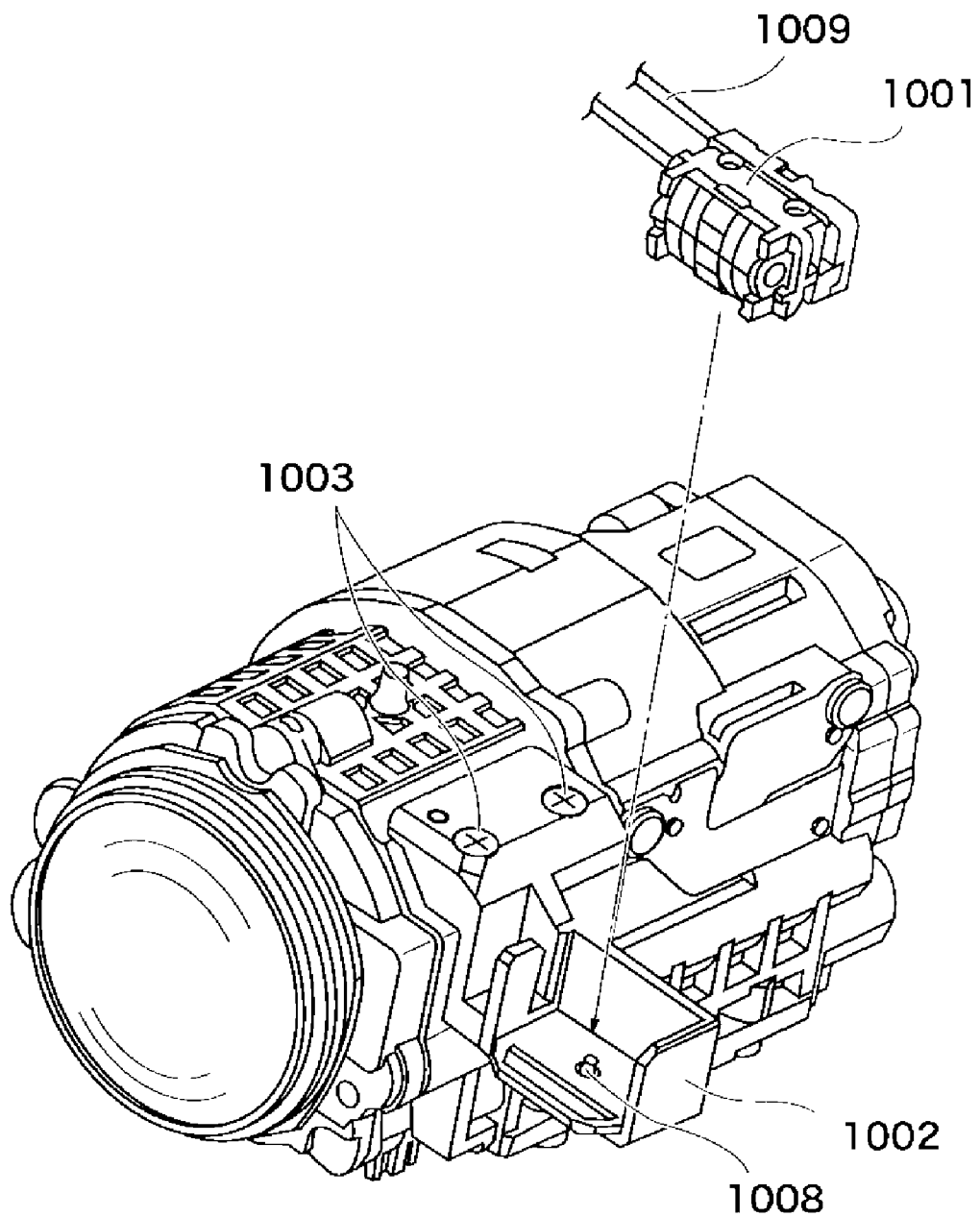
FIG. 5 is a perspective view of the principal part of the conventional image pickup apparatus with the AF sensor unit detached therefrom.

In this AF sensor unit 1, the AF sensor holder-mounting unit 8 has a spectacle lens 9 mounted on through a bonding and securing process (FIG. 3). It should be noted that the spectacle lens 9 and the AF sensor holder-mounting unit 8 are manufactured with predetermined respective precisions, and hence can be assembled without any special positioning.

In FIG. 3, an AF sensor holder 12 is made of a box-like resin component, and an AF sensor 10 is mounted on the AF sensor holder-mounting unit 12 at a predetermined location through a bonding and securing process. In this case also, it is not necessary to perform any positioning either.

This AF sensor 10 is mounted on the flexible board 11. It should be noted that the flexible board 11 with the AF sensor 10 is connected to a circuit board of the camera main body.

The AF sensor holder 12 having the AF sensor 10 mounted thereon as described above is mounted on the AF sensor holder-mounting unit 8 through a bonding and securing process via an AF sensor washer 13 for focus adjustment.

The mounting of the AF sensor 10 is adjusted by the above described waveform measurement method implemented for the AF sensor 10. On this occasion, several kinds of focus adjustment AF sensor washers 13 having various thicknesses are prepared previously, and one of the AF sensor washers 13 that can achieve the sharpest focus is used.

A description will now be made of a process of securing the AF sensor unit 1 to the lens unit 2.

First, the AF sensor unit 1 is mounted on an AF sensor unit-mounting seat 14.

To this end, the AF sensor holder-mounting unit 8 is fastened to the AF sensor unit-mounting seat 14 by inserting a rotary shaft boss 14c of the AF sensor unit-mounting seat 14 to a shaft hole 8b of the AF sensor holder-mounting unit 8, and threading a vertical axis rotation-fixing screw 6 into a screw hole 14d, with the fixation screw 6 inserted through a washer 7. In the following description, the vertical axis is equivalent to the "X-axis" in FIG. 1, and the "second axis".

Further, with the AF sensor holder-mounting unit 8 being fastened to the AF sensor unit-mounting seat 14, a vertical axis rotation-adjusting eccentric pin 3 is inserted into an elongated hole 8a disposed through a protruding piece extending from the AF sensor holder-mounting unit 8, and a leading end portion of the vertical axis rotation-adjusting eccentric pin 3 is press-fitted into an insertion hole 14e disposed in the AF sensor unit-mounting seat 14.

A rotation center axis of rotation of the vertical axis rotation-adjusting eccentric pin 3 and a rotation center axis of the AF sensor holder-mounting unit 8 are perpendicular to each other. Further, a head 3a of the vertical axis rotation-adjusting eccentric pin 3 is oval in cross-sectional shape, or more specifically, is ellipsoidal, as shown in FIG. 3. A shaft of the vertical axis rotation-adjusting eccentric pin 3 is fixed to the head 3a at one focal point of the ellipsoid. Therefore, rotational movement of the vertical axis rotation-adjusting eccentric pin 3 allows the side face portion on the curved surface of the head 3a to slide along a wall portion defining the elongated hole 8a, which enables the AF sensor unit 1 to be stably positioned. In this manner, the head 3a and the elongated hole 8a constitute an eccentric cam mechanism as "the second axis rotation-adjusting mechanism".

An operator rotatably moving the vertical axis rotation-adjusting eccentric pin 3 with a driver or the like causes the side face portion of the head 3a of the vertical axis rotation-adjusting eccentric pin 3 to push the wall portion defining the elongated hole 8a of the AF sensor holder-mounting unit 8, and adjust a vertical axis rotation tilt θ2 of the AF sensor unit 1.

The vertical axis rotation-adjusting eccentric pin 3 and the insertion hole 14e are configured to be slightly press-fitted into each other. Once it is inserted into the insertion hole 14e, the vertical axis rotation-adjusting eccentric pin 3 press-fitted into the insertion hole 14e in this manner is not easily pulled out of the insertion hole 14e, but is held in the insertion hole 14e in a state where the eccentric pin 3 can be rotatably moved in the rotation direction with a small force.

A description will now be made of a process of mounting the AF sensor unit-mounting seat 14, having the AF sensor unit 1 mounted thereon, on the image pickup lens unit 2.

The AF sensor unit-mounting seat 14 is pivotably mounted on the lens unit 2 at an intermediate location on a side face of a first supporting plate portion 24 with a horizontal axis rotation-fixing screw 5 so as to rotatably move about the horizontal axis. In the following descriptions, the horizontal axis is equivalent to the "Y-axis" in FIG. 1, and the "first axis".

As shown in FIG. 3, the AF sensor unit-mounting seat 14 is placed on a boss 2b protruding from an upper portion of the lens unit 2, with the boss 2b being inserted to a fitting hole 14b disposed on the bottom portion of the AF sensor unit-mounting seat 14. The horizontal axis rotation-fixing screw 5 inserted through a washer 7 is threadably secured into a screw hole 2c of the stationary cylinder of the lens unit 2 via the fitting hole 14b. Further, a horizontal axis rotation-adjusting eccentric pin 4 is inserted into an elongated hole 14a disposed in the base end portion of the bottom portion of the AF sensor unit-mounting seat 14, and is press-fitted into an insertion hole 2a disposed in the lens unit 2. On this occasion, the horizontal axis rotation-adjusting eccentric pin 4 and the insertion hole 2a are configured to slightly press-fitted into each other. With this arrangement, once it is inserted into the insertion hole 2a, the horizontal axis rotation-adjusting eccentric pin 4 is not easily pulled out of the insertion hole 2a, but is held in the insertion hole 2a in a state where the eccentric pin 4 can be rotatably moved in the rotation direction with a small force.

A rotation center axis of the horizontal axis rotation-adjusting eccentric pin 4 and the rotation center axis of the AF sensor unit-mounting seat 14 are parallel to each other. Further, a head 4a of the horizontal axis rotation-adjusting eccentric pin 4 is oval in cross-sectional shape, or more specifically, is ellipsoidal, as shown in FIG. 3. A shaft of the horizontal axis rotation-adjusting eccentric pin 4 is fixed to the head 4a at one focal point of the ellipsoid. Therefore, rotational movement of the horizontal axis rotation-adjusting eccentric pin 4 allows the side face portion on the curved surface of the head 4a to slide along a wall portion defining the elongated hole 14a, which enables the AF sensor unit 1 to be stably positioned. In this manner, the head 4a and the elongated hole 14a constitute an eccentric cam mechanism as "the first axis rotation-adjusting mechanism".

An operator rotatably moving the horizontal axis rotation-adjusting eccentric pin 4 with a driver or the like causes the side face portion of the head 4a of the horizontal axis rotation-adjusting eccentric pin 4 to push the wall portion defining the elongated hole 14a of the AF sensor unit holder-mounting seat 14, and adjust a horizontal axis rotation tilt θ1 of the AF sensor unit 1.

This image pickup apparatus includes the AF sensor unit-mounting seat 14 for adjusting the horizontal axis rotation and the AF sensor holder-mounting unit 8 for adjusting the vertical axis rotation, serving as the structure for adjusting the attitude of the pickup apparatus with respect to the horizontal axis rotation direction and the vertical axis rotation direction.

This AF sensor unit-mounting seat 14 includes the first supporting plate portion 24 with a substantially elongated plate-like shape for adjusting the horizontal axis rotation, and a second supporting plate portion 25 with a substantially rectangular plate-like shape extending orthogonally from one end of the first supporting plate portion 24, which causes the AF sensor unit-mounting seat 14 as a whole to have a substantially L-like shape.

The first supporting plate portion 24 has the rotation supporting fitting hole 14b at a substantially center portion thereof in its longitudinal direction, and further has the elongated hole 14a disposed in the end portion on the opposite side of the second supporting plate portion 25.

This first supporting plate portion 24 is supported so as to rotatably move in a very small angle with respect to the lens unit 2 by the horizontal axis rotation-fixing screw 5 pivotably fitted into the fitting hole 14b.

The second supporting plate portion 25 of the AF sensor unit-mounting seat 14 has mounted thereon the AF sensor holder-mounting unit 8 for adjusting the vertical axis rotation.

The second supporting plate portion 25 has the rotary shaft boss 14c of a cylindrical large thickness shape protruding at a base end portion thereof (on a side of the first supporting plate portion 24). The rotary shaft boss 14c has the screw hole 14d disposed through its center portion along the rotation center axis. Further, the second supporting plate portion 25 has the insertion hole 14e, to which the vertical axis rotation-adjusting eccentric pin 3 is to be inserted, disposed at the end face portion of the free end thereof.

The AF sensor holder-mounting unit 8 also includes a second side plate portion 28 mounted on the second supporting plate portion 25 of the AF sensor unit-mounting seat 14 and disposed so as to receive the AF sensor unit 1 while overlapping with the second supporting plate portion 25 in the AF sensor unit-mounting seat 14, and a first side plate portion 29 orthogonally extending from one end portion of the second side plate portion 28 and facing the end face of the free end of the second supporting plate portion 25.

The second side plate portion 28 of the AF sensor holder-mounting unit 8 has the shaft hole 8b disposed on the end portion thereof on an opposite side of the first side plate portion 29.

With the rotary shaft boss 14c rotatably inserted into this shaft hole 8b, the vertical axis rotation-fixing screw 6 is threaded into the screw hole 14d through the washer 7, and then the first side plate portion 28 rotatably supported on the AF sensor unit-mounting seat 14 about the rotation center axis of the boss 14c. With this arrangement, the AF sensor holder-mounting unit 8 is supported on the second supporting plate portion 25 of the AF sensor unit-mounting seat 14, so as to rotatably move in a very small angle about the rotary shaft boss 14c.

The above-mentioned elongated hole 8a is disposed on the second side plate portion 29 of the AF sensor holder-mounting unit 8.

A description will now be made of the parallax adjustment method implemented for the AF sensor unit 1 in the above-mentioned structure.

According to this parallax adjustment method, the operator first rotatably moves the horizontal axis rotation-adjusting eccentric pin 4 to adjust the horizontal axis rotation tilt θ1 of the AF sensor unit 1.

The operator then rotatably moves the vertical axis rotation-adjusting eccentric pin 3 to adjust the vertical axis rotation tilt θ2 of the AF sensor unit 1.

Lastly, the operator applies a screw locking adhesive agent to respective head portions of the vertical axis rotation-adjusting eccentric pin 3, the horizontal axis rotation-adjusting eccentric pin 4, the horizontal axis rotation-fixing screw 5, and the vertical axis rotation-fixing screw 6 to prevent the rotation deviation due to the dropping caused by vibrations.

As described above, the AF sensor unit 1 is mounted on the lens unit 2 with the attitude adjusted with respect to the horizontal axis rotation direction and the vertical axis rotation direction.

According to this embodiment, rotatably moving the horizontal axis rotation-adjusting eccentric pin 4 enables the AF sensor unit 1 including the AF sensor unit-mounting seat 14 and the AF sensor holder-mounting unit 8 to be rotatably moved to adjust the horizontal axis rotation tilt θ1.

Also, according to this embodiment, rotatably moving the vertical axis rotation-adjusting eccentric pin 3 enables the AF sensor unit 1 including the AF sensor holder-mounting unit 8 to be rotatably moved to adjust the vertical axis rotation tilt θ2.

According to this embodiment, after the AF sensor unit 1 has been positioned, the AF sensor unit 1 moves neither in the vertical axis rotation direction nor in the horizontal axis rotation direction, so long as the vertical axis rotation-adjusting eccentric pin 3 or the horizontal axis rotation-adjusting eccentric pin 4 is rotatably moved. This eliminates the need for waiting for curing of the screw locking adhesive agent after the application of the adhesive agent, thereby preventing the manufacturing time from increasing.

According to this embodiment, the vertical axis rotation-adjusting eccentric pin 3, the horizontal axis rotation-adjusting eccentric pin 4, the horizontal axis rotation-fixing screw 5, and the vertical axis rotation-fixing screw 6 have the respective rotation center axes on the same plane (the A-A' cross-sectional plane), as shown in FIG. 2A. This miniaturizes the parallax adjustment mechanism, and also reduces a work space for adjustment tools such as a driver used for the vertical axis rotation adjustment and the horizontal axis rotation adjustment of the AF sensor unit 1.

According to this embodiment, the vertical axis rotation adjustment and the horizontal axis rotation adjustment of the AF sensor unit 1 can be realized by rotatably moving the vertical axis rotation-adjusting eccentric pin 3 and the horizontal axis rotation-adjusting eccentric pin 4, which eliminates the adhesive curing stress, compared with a case in which the bonding is carried out with the use of an adhesive agent, and reduces the positional deviation of the AF sensor unit 1 due to temperature changes, dropping, or vibrations, and also shortens the time for UV radiation bonding in the assembling process.

According to this embodiment, the load added to the time of adjustment is imposed on the mounting seat and the stationary cylinder of the AF sensor unit 1 having high rigidity, thereby reducing the deflection at the time of adjustment, which enables the AF sensor unit 1 to be positioned with high precision. This prevents a positional deviation of the AF sensor unit 1 more effectively, compared with a fixing method using a UV curing adhesive material.

According to this embodiment, the vertical axis rotation-adjusting eccentric pin 3 and the horizontal axis rotation-adjusting eccentric pin 4 are identical in rotation direction with each other, which enables the adjustment process to be performed with a driver or the like operated in one direction, and enables the holes for adjustment and the cover allocation to be limited to one direction to thereby enable the cover covering this portion to be allocated in a simple manner.

According to this embodiment, the rotation centers of the horizontal axis rotation adjustment and the vertical axis rotation adjustment are disposed closer to the AF sensor, and the eccentric pins are disposed outside the rotation center axes of the horizontal axis rotation adjustment and the vertical axis rotation adjustment, which allows the vicinity of the AF sensor that is a heavy object to be secured, and hence makes it difficult to cause the positional deviation by an external force applied due to vibrations or dropping. Further, with this arrangement, it is possible to set the distances between the rotation center axes of the horizontal axis rotation adjustment and the vertical axis rotation adjustment to the rotation center axes of the eccentric pins so as to correspond to the adjustment sensitivity. That is, it is possible to optimize the adjustment sensitivity for rotatably moving the eccentric pins by adjusting the distances between the rotation center axes of the eccentric pins and the rotation center axes of the AF sensor unit and the AF sensor unit-mounting seat, without an excessive increase in size, and furthermore, it is possible to prevent the interference between adjustment tools such as a driver at the time of assembling. Also, a curved section of the head of each of the eccentric pins enables the AF sensor unit to be smoothly adjusted in cooperation with the rotational operations of the eccentric pins without any problem, even when the rotation center axes of the eccentric pins are perpendicular to the rotation center axis of the AF sensor unit.

In this embodiment, it should be noted that the AF sensor unit-mounting unit 14 is mounted on the stationary cylinder rotatably with respect to the horizontal axis (the first axis, or the Y-axis), and the AF sensor holder-mounting unit 8 is mounted on the AF sensor unit-mounting unit 14 rotatably with respect to the vertical axis (the second axis, or the X-axis); however, the AF sensor unit-mounting unit 14 may be mounted on the stationary cylinder rotatably with respect to the vertical axis (the second axis, or the X-axis), and the AF sensor holder-mounting unit 8 may be mounted on the AF sensor unit-mounting unit 14 rotatably with respect to the horizontal axis (the first axis, or the Y-axis).

Also, according to this embodiment, the side faces of the respective heads of the vertical axis rotation-adjusting eccentric pin 3 and the horizontal axis rotation-adjusting eccentric pin 4 are curved; however, the side faces of the respective heads of the vertical axis rotation-adjusting eccentric pin 3 and the horizontal axis rotation-adjusting eccentric pin 4 may be flat, and further the wall portions defining the elongated holes of the AF sensor holder-mounting unit and slidably contacting the respective heads may be curved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2009-290967, filed Dec. 22, 2009, which is hereby incorporated by reference herein in its entirety.

What is claimed is:

1. An image pickup apparatus with an AF sensor unit, having a stationary cylinder constituting an image pickup lens barrel with a first axis and a second axis that are perpendicular to an optical axis of the lens barrel and are perpendicular to each other, said image pickup apparatus comprising:
   an AF sensor holder configured to hold said AF sensor; and
   an AF sensor holder-mounting unit mounted on the stationary cylinder through a first axis rotation-adjusting mechanism rotatably with respect to the first axis, and configured to support said AF sensor holder through a second axis rotation-adjusting mechanism rotatably with respect to the second axis, wherein the first axis rotation-adjusting mechanism and the second axis rotation-adjusting mechanism are directed in the same direction at operation sides thereof, respectively.

2. The image pickup apparatus as claimed in claim 1, wherein the AF sensor holder-mounting unit has an L-shaped member comprised of a first supporting plate portion and a second supporting plate portion that are perpendicular to each other, said AF sensor holder has an L-shaped member comprised of a first side plate portion and a second side plate portion that are perpendicular to each other, the first supporting plate portion is screwed to the stationary cylinder rotatably about the first axis with a first screw, and the first side plate portion is screwed to the second supporting plate portion rotatably about the second axis with a second screw, the first axis rotation-adjusting mechanism has a first elongated hole disposed on the first supporting plate portion, and a first eccentric pin screwed to the stationary cylinder through the first elongated hole and having an ellipsoidal head slidably contacting the first elongated hole, and the second axis rotation-adjusting mechanism has a second elongated hole disposed on the second side plate portion, and a second eccentric pin screwed to the second supporting member through the second elongated hole and having an ellipsoidal head slidably contacting the second elongated hole.

3. The image pickup apparatus as claimed in claim 2, wherein the first eccentric pin and the second eccentric pin have rotation center axes parallel to the first axis, respectively.

4. The image pickup apparatus as claimed in claim 3, wherein the first screw, the second screw, the first eccentric pin, and the second eccentric pin have rotation center axes in the same plane, respectively.

* * * * *